(12) United States Patent
Thrower et al.

(10) Patent No.: US 7,530,104 B1
(45) Date of Patent: May 5, 2009

(54) THREAT ANALYSIS

(75) Inventors: Woodrow A. Thrower, Orem, UT (US); Sourav S. Bhattacharya, Fountain Hills, AZ (US)

(73) Assignee: Symantec Corporation, Cupertino, CA (US)

( * ) Notice: Subject to any disclaimer, the term of this patent is extended or adjusted under 35 U.S.C. 154(b) by 782 days.

(21) Appl. No.: 10/775,758

(22) Filed: Feb. 9, 2004

(51) Int. Cl.
*G06F 11/00* (2006.01)
*G06F 12/16* (2006.01)
*G08B 23/00* (2006.01)

(52) U.S. Cl. ............................ 726/22; 726/25; 713/188
(58) Field of Classification Search .................. 726/25, 726/22; 713/188
See application file for complete search history.

(56) References Cited

U.S. PATENT DOCUMENTS 6,952,779 B1 * 10/2005 Cohen et al. .................. 726/22

2004/0205419 A1 * 10/2004 Liang et al. ..................... 714/57

OTHER PUBLICATIONS

Bruce Schneier, Modeling Security Threats, Attack Trees, Dr. Dobb's Journal, Dec. 1999.

* cited by examiner

*Primary Examiner*—Christopher J Brown
(74) *Attorney, Agent, or Firm*—Van Pelt, Yi & James LLP

(57) ABSTRACT

Virtual penetration testing using threat analysis is disclosed. Threat analysis may be achieved by evaluating attack paths and chain reactions of compromised assets created by threats, threat agents, or threat mechanisms. A threat agent having an existing access level is identified. The existing access level is used to analyze an attack path between the threat agent and an asset. The existing access level is updated if the analysis of the attack path between the threat agent and the asset indicates that an attack along the path would be successful.

17 Claims, 11 Drawing Sheets

THREAT ANALYSIS

FIELD OF THE INVENTION

The present invention relates generally to computer and data security. More specifically, incidental and speculative threat analysis using virtual penetration testing, attack paths, and chain reactions is disclosed.

BACKGROUND OF THE INVENTION

Computer and network security use a variety of techniques. Regardless of the precautions taken, when a system or system component compromise occurs, access can spread to other systems or components. Applications, systems, information, employees' time, physical objects, and other resources (referred to herein as assets) can be compromised if an attacker gains sufficient access.

An initial attack phase might result in an attacker gaining access that makes one or more further attacks in a second attack phase possible. The further attacks might in turn lead to even greater access, facilitating a third attack phase, and so on. However, it is often difficult to determine how an attack on a system occurs or may occur. The attack path or "chain reaction" of exploits that can lead to severe compromise are difficult to determine.

Thus, it would be useful for system and/or security administrators to be able to analyze how an actual or hypothetical attacker having known or hypothetical initial access can potentially compromise assets through such successive attack waves. It would also be useful to determine how an attack occurs in order for system and/or security administrators to interrupt an attack path or chain reaction before critical assets are compromised.

BRIEF DESCRIPTION OF THE DRAWINGS

Various embodiments of the invention are disclosed in the following detailed description and the accompanying drawings.

DETAILED DESCRIPTION

Figure 1A:
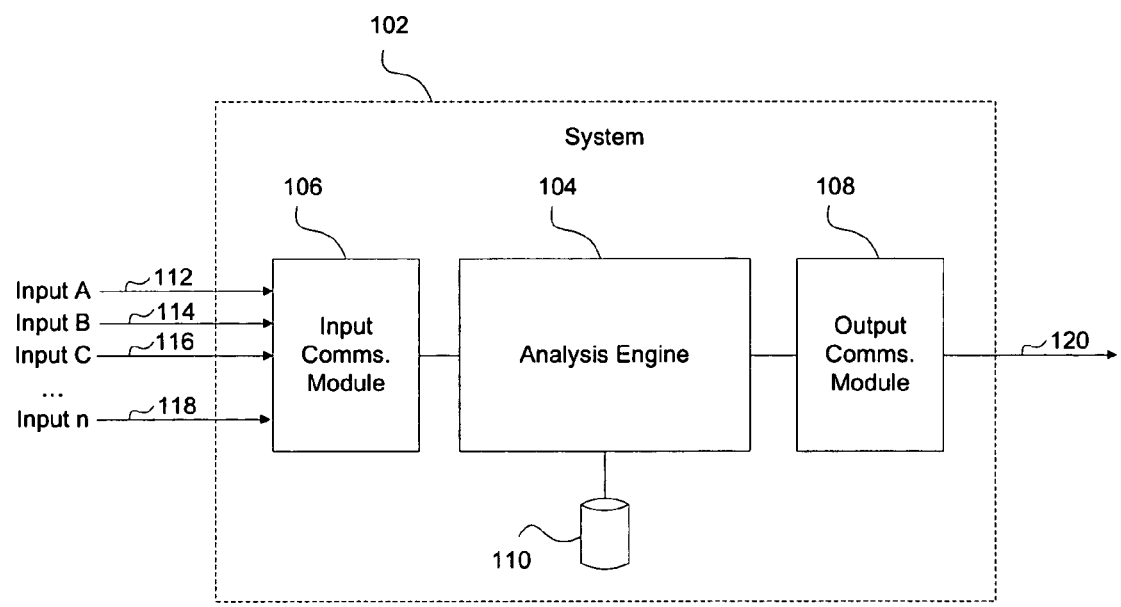
FIG. 1A illustrates a system, in accordance with an embodiment.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Compromise of a system or network may be prevented or halted by analyzing and interrupting attack paths or chain reactions actually or potentially caused by threats and threat agents. Attack paths and chain reactions may be used interchangeably, but both generally describe an end-to-end route that an attacker may use to conduct an attack. An attack path may also be described as a sequence of threats that increases the assets directly at risk, or increases the degree of direct risk to assets. A chain reaction may also be described as the phenomenon that occurs when vulnerabilities are exploited resulting in attack paths.

A threat may be described as an action or event with the potential of adverse security implications. A specific threat includes a threat agent (an attacker, for example), a method of attack, and an attack target. Examples of threats may include an attacker exploiting a vulnerability to disclose confidential information, an earthquake destroying computing hardware, or a doctor accidentally associating medical records with the wrong patient. Determining and evaluating an attack path or chain reaction can enable a network, system, or security administrator to protect assets from attacks, such as taking a key system offline or using other controls (e.g., by installing a software patch) prior to the compromise of the asset. An asset, as used herein, may refer to a system or system resource that can include components such as operating systems, applications, clients, servers (both hardware and software), a defined level of system access, or any other type of resource that a user may wish to keep protected from an outside party. An asset at risk may also be described as a threat target of a threat agent, which is described in greater detail below. Assets may comprise and/or reside on a system or network. Assets may be defined by discovering them automatically, such as by using one or more software tools, or they may also be defined manually, such as by an administrator. A vulnerability is a known or unknown security weakness or susceptibility that may be used to gain access to an asset by employing an exploit (or one of a plurality of exploits) associated with the vulnerability, which determines the type of access required to exploit the vulnerability. Vulnerabilities may be revealed by a number of sources including security applications, firewalls, systems, system components, or any of a number of other inputs that may provide control and vulnerability data. Controls may include system or network features that can be used to detect vulnerabilities and mitigating controls that may not necessarily eliminate a threat, but may remove threat agents or decrease the degree of potential compromise. An example of a control may include a vulnerability assessment application (detect) or firewall (eliminate/removes threat agents). Other examples of controls are software patches, configuration changes, security procedures, etc. Access is also a variable when analyzing threats and threat agents and can be described in terms of existing access, prerequisite access, and resulting access levels. The latter two access levels, prerequisite and resulting, will be described in greater detail below. Threats, threat agents, assets, controls, vulnerabilities, and exploits can be analyzed, as described in greater detail below, to learn attack paths, vectors, and chain reactions in order to ward off or stop intrusions.

In general, protection may be implemented by requiring users to have a particular level of access. The prerequisite access level required in order to exploit a vulnerability to gain access to an asset may be used to effectively limit the number of users, ward off unwanted users, or fend off probes and attackers. Attackers (also called threat agents) may include intruders, hackers, phreakers, Trojan Horses, worms, viri, nature, or other types of external threats to a system. A threat agent may be a source (or potential source) of action that causes or supports a threat. In the above examples describing threats, the threat agents may be a deliberate attacker, nature (i.e., an earthquake destroying hardware), or doctor mistakenly associating records with the wrong patients. An escalating attack against an asset may occur because the attacker has access to a lower-level or secondary asset, which may not be the primary target of the attack. However, if the attacker gains or has access to the secondary asset, the attacker may be able to gain access to the primary target. For example, if the attacker has or gains an existing level of access that is greater than or equal to a prerequisite level of access required to exploit a vulnerability of the secondary asset, the successful completion of the exploit might provide resulting access that would allow the attacker to exploit a vulnerability of the primary system that the attacker might not otherwise have been able to exploit (e.g., because the attacker's initial level of access was not greater than or equal to the prerequisite access required to exploit the vulnerability of the primary system). As used herein, systems may include computers, servers, clients, applications, switches, terminals, etc. Preventing or stopping an attacker from gaining access to an asset, even if in possession of a prerequisite access level for a secondary or lower-level asset, may be achieved using the techniques described below. As an example, an attacker has existing access to asset A, but wants access to asset B. Vulnerability, V, has prerequisite access to A, and resulting access to B. The attacker can use the access to asset, A, to exploit vulnerability, V, and gain access to asset, B. The above analysis demonstrates an indirect threat to B whether the attacker is real or hypothetical, and makes it possible to identify controls that eliminate or mitigate the threat.

FIG. 1A illustrates a system, in accordance with an embodiment. In this example, a system 102 includes an analysis engine 104, an input communications module 106, an output communications module 108, and a database 110. Each of modules 104-110 may be implemented using hardware, software, or a combination of both. System 102 may be used as a standalone application or system or as a component of another system. System 102 may be a network security, incident, event, intrusion detection, vulnerability assessment, or other type of security system. Analysis engine 104 can be configured to process and analyze information or data communicated from other components or systems.

As used in this example, data can be organized into both control and vulnerability data. Control data refers to data and information that may be used for various types of control functions such as protecting system assets, invoking protections or security measures/countermeasures, changing system configuration settings (e.g., access levels, changing/implementing passwords, etc.). Such controls may affect the existing access of a threat agent, the prerequisite access required to successfully exploit a vulnerability, and/or the resulting access attained by successful exploitation of a vulnerability. Vulnerability data refers to data and information used by analysis engine 104 to determine whether one or more vulnerabilities exist in a particular system or system component. Vulnerability data may also include data and information about specific vulnerabilities, such as notices, warnings, patches, or other information that may promulgated by various security application developers such as Symantec Corporation, Network Associates, Microsoft Corporation, etc. Vulnerability data may comprise data concerning one or more known exploits that may be used or attempted to be used to exploit the vulnerability. Control and vulnerability data may be used to analyze an attack path of a threat or a chain reaction caused by a threat to an asset. In other embodiments, other types of data and information may be used.

In this example, inputs 112-118 represent n inputs that can provide data to system 102. In this embodiment, inputs 112-118 may provide control and vulnerability data that can be processed and analyzed by analysis engine 104. More or fewer inputs may be used to implement inputs 112-118. Based on the results of analysis engine 104, output data and information may be output via communications module 108 or stored in database 110. In this embodiment, data may be stored in database 110, which may be implemented using an internal or external storage buffer, cache, memory, disk, RAID, hard drive, or other storage medium. Database 110 may also be implemented using a single storage device or multiple storage devices (e.g., SAN, NAS, etc.). Data stored in database 110 or used in output 120 may be related to assets and exploits associated with vulnerabilities or controls used to invoke access requirements for system 102. In alternative embodiments, the above types of data may be used for inputs 112-118. Output 120 may include control or other types of data and information for input to other systems or system components for managing security, security measures/counter measures, intrusion detection, vulnerability assessment, or other types of security applications. Output 120 may also be used as an input to a reporting interface for network security administrators to monitor the status of a particular system or host on which system 102 is installed. In some embodiments, the output 120 may comprise reporting information concerning the attack path analysis performed by the analysis engine 104, as described more fully below. In still other embodiments, output data and information might be used for functions other than those mentioned above.

Figure 1B:
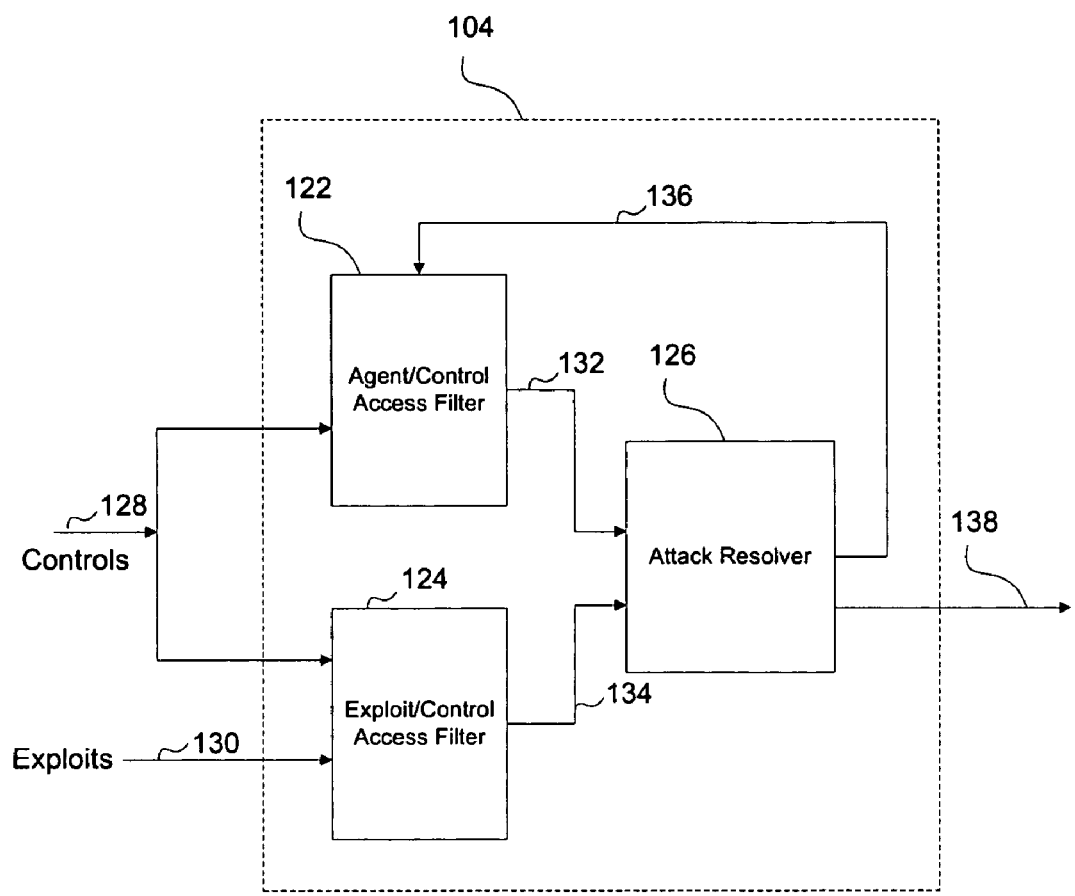
FIG. 1B illustrates an analysis engine, in accordance with an embodiment.

FIG. 1B illustrates an analysis engine, in accordance with an embodiment. The analysis engine 104 comprises an agent/control access filter 122, exploit/control access filter 124, and attack resolver 126. Controls data 128 is input to agent/control access filter 122 and exploit/control access filter 124. Exploits data 130 is also input to exploit/control access filter 124. The exploits data 130 may comprise data associated with one or more exploits that may be used to exploit one or more vulnerabilities known to be associated with one or more assets comprising the network being protected by the analysis engine 104 and associated components. The controls data 128 may likewise relate to one or more such assets, and/or to the network as a whole. Agent/control access filter outputs filtered agent access data 132 to attack resolver 126. Using filtered exploit prerequisite/resulting access data 134, provided as output by exploit/control access filter 124, attack resolver 126 outputs updated agent access data 136 that is used in a subsequent iteration to determine whether a threat agent has achieved or could achieve, as the result of an attack analyzed in a previous iteration, an updated existing access level that enables or would enable it to perform successfully a further exploit (i.e., as a result of having attained an updated existing access level that satisfies the prerequisite access level required to perform the further exploit and thereby gain the resulting access level associated with the successful completion of the further exploit).

Agent/control access filter 122 uses controls data 128 to determine filtered agent access data 132 by determining the effect the applicable control(s) have on the existing access level of a threat agent being analyzed. Exploit/control access filter 124 uses controls data 128 and exploits data 130 to determine the effect the applicable control(s) have on the prerequisite access level required to perform each exploit associated with exploits data 130 and/or the resulting access level that may be attained through successful use of the exploit(s). The filtered agent access data 132 and filtered exploit prerequisite/resulting access data 134 are used by the attack resolver 126 to determine if the existing access level of the threat agent being analyzed is equal to or greater than the prerequisite access required to use successfully any applicable exploit. If the existing access level of a threat agent meets or exceeds the prerequisite access level associated with an exploit, then attack resolver 126 may determine that the threat agent gains a resulting access level associated with successful use of the exploit. The resulting access thus attained would be provided as output on line 136 in the form of an update to the existing access level of the threat agent being analyzed, which then becomes the existing access level of the threat agent that is processed by the agent/control access filter 122 in a next iteration of the attack path analysis performed by the analysis engine 104 (i.e., the next link or stage in the attack path/chain reaction). If a threat agent does not have an existing access level that meets or exceeds a prerequisite access level, then the resulting access associated with the exploit is not gained. This will be discussed in greater detail below. Once the analysis engine 104 determines, by performing as many iterations of the above-described processing as may be required, that the threat agent being analyzed cannot perform successfully any further exploits (i.e., there are no further applicable exploits for which the updated and filtered existing agent access is greater than or equal to the prerequisite access level required to perform the exploit successfully), the analysis engine 104 completes its processing of the threat agent and provides output data associated with its analysis in the form of output data 138. In the embodiment shown in FIG. 1A, the output data 138 may be provided as input to the output communication module 108. In some embodiments, the output data 138 can be used by applications such as an intrusion detection system, network security application, security management, vulnerability assessment, or another type of security application. Output data 138 may also represent a final output of consolidated information such as a summary of attack path, chain reaction, or access information (e.g., prerequisite, resulting, etc.) that may be used to alter or modify access levels in order to prevent an intrusion, stop an intrusion, manage network/application security, report security information to network administrators, etc.

Figure 1C:
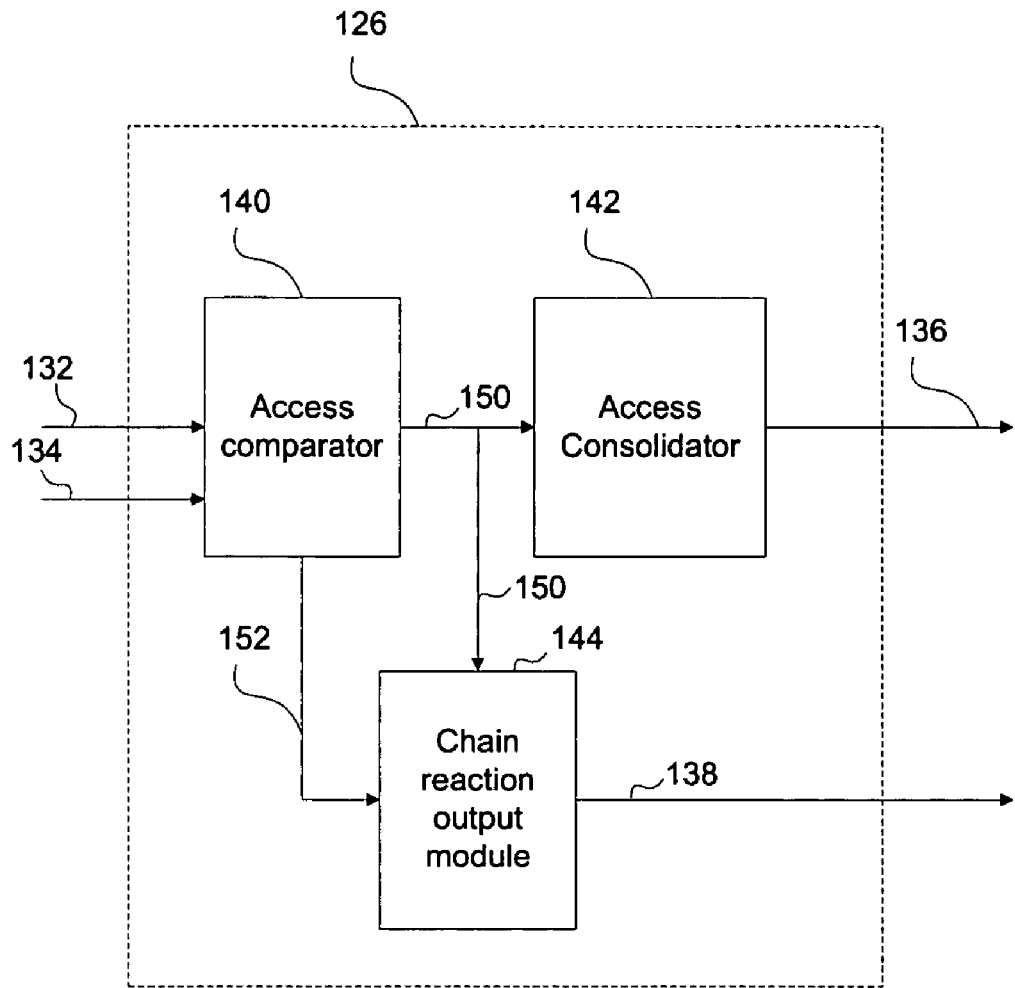
FIG. 1C illustrates an attack resolver, in accordance with an embodiment.

FIG. 1C illustrates an attack resolver, in accordance with an embodiment. Attack resolver 126 is illustrated in further detail, in this embodiment, including access comparator 140, access consolidator 142, and chain reaction output module 144. Filtered agent access data 132 and filtered exploit prerequisite/resulting access data 134 are input to access comparator 140. Access comparator compares filtered agent access data 132 and filtered exploit prerequisite/resulting access data 134 to generate resulting access data 150 and control data 152 that signals when the last iteration of processing by attack resolver 126 occurs (i.e., the filtered updated existing agent access is not greater than or equal to the filtered prerequisite access for any further exploit). Control data 152 triggers chain reaction output module 144 to provide final output data 138, which as noted above may include data about attack paths and chain reactions for threats/threat agents and assets subject to compromise by exploiting vulnerabilities associated with the assets. The resulting access data 150 is supplied to the chain reaction output module 144, where for each iteration of the attack resolver 126 data associated with exploits that have been (or could be) exploited successfully by the threat agent being analyzed is stored. In some embodiments, the resulting access data 150 may comprise for each exploit it has been determined the threat agent being analyzed has exploited or could exploit data associated with the exploit, the vulnerability with which it is associated, and the asset(s) that have been or would be affected. In some embodiments, the chain reaction output module 144 may be configured to use this data to build a map of the actual or potential attack paths that a threat agent being analyzed has exploited or could exploit. In some embodiments, the chain reaction output module 144 may be configured to store only the final, resulting access that has been or could be attained by the threat agent if the agent were to pursue to the end each and every attack path potentially available to it.

Access consolidator 142 receives resulting access data and generates consolidated access data 136. Consolidated access data 136 can be used to determine a "superset" (as further described below) of resulting access that has been or could be attained by the successful completion of all of the exploits for which the threat agent's filtered agent access exceeds the prerequisite access associated with the exploit. In so doing, access consolidator 142 eliminates overlap and/or redundancy in the resulting access data, such as where two different exploits have resulted or would result in the same access being attained. Consolidated access data 136 and final output data 138 may be stored in database 110 (FIG. 1A), reported to an interface, or used by other modules, components, or systems.

Figure 2:
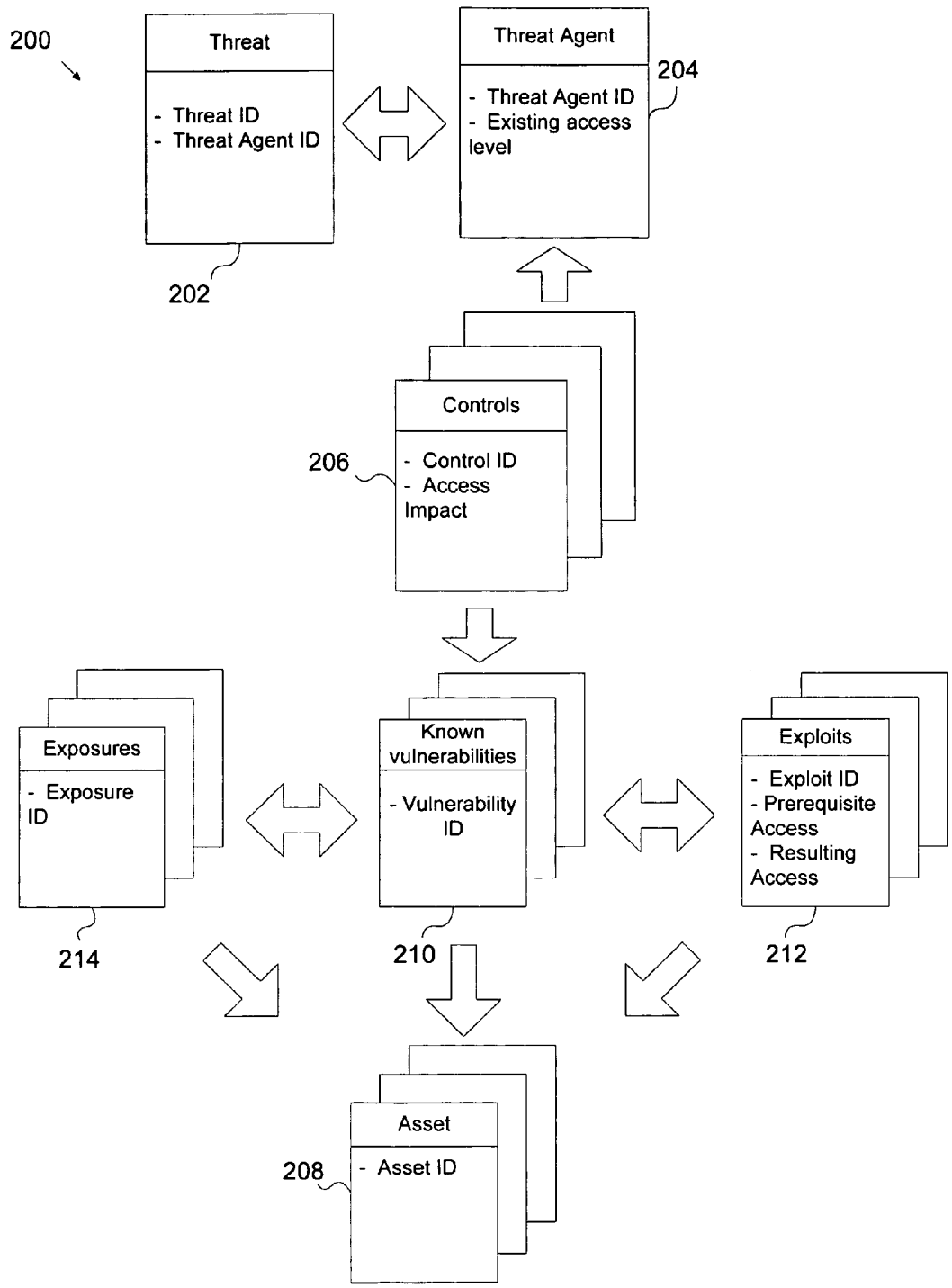
FIG. 2 is a relational diagram, in accordance with an embodiment.

FIG. 2 illustrates various data entities and their relationship with each other, in accordance with an embodiment. In the example shown, data related to threats 202, threat agents 204, controls 206, assets 208, known vulnerabilities 210, exploits 212, and exposures 214 can be stored in a data structure (e.g., tables, queues, files, forms, etc.). Identification may be used to identify a specific threat, threat agent, control, asset, vulnerability or exploit, as shown in this example. Threat data 202 may include one or more identifiers including a threat ID used to uniquely identify a particular threat and one or more threat agent IDs used to identify the threat agent(s) associated with the threat. In one example, a threat agent can implement a threat to an asset. In other examples, a threat agent may be able to institute multiple threats to an asset or a single threat to multiple assets. Threat agent data 204 may include a threat agent id and an existing access level associated with the threat agent. Control data 206 may comprises a control identifier and access impact data. Threat agent data 204 and control data 205 may be used to determine the relationship between threat agents and controls. However, in some embodiments, the context of a threat agent's existing access may be considered along with the context of threat targets (discussed in greater detail below in connection with FIG. 5).

In some cases, evaluating the context associated with a threat agent, asset, or other entity may help determine or narrow an evaluation of an attack path or chain reaction. The use of a context may help eliminate excessive processor or latency requirements. For example, if a threat agent masking as a customer relationship management (CRM) application attempts to gain access to a host file containing customer data (e.g., names, addresses, purchase order history, etc.), then the context would also indicate that reviewing a downloadable music application may be unnecessary. In other words, by also considering the context of the threat agent or access level of an asset, the determination of what assets are ultimately compromised may be narrowed down, thus preventing any unnecessary processor usage or latency increases. However, in other cases, context may not be necessary if, for example, a network or security administrator can configure a threat analysis to focus on a specific set of assets or access levels (e.g., existing, resulting, etc.).

Regardless of the threat analysis used, an asset may be compromised with respect to one of four factors, integrity, availability, confidentiality, and auditability. Asset auditability indicates whether a compromise to asset integrity, availability, or confidentiality may be identified during an audit. An audit may be used to detect a compromise to the above factors, including asset auditability.

The access impact data included with control data 206 may indicate the impact the control has on the existing access of a threat agent, the prerequisite access required to perform an exploit successfully, and/or the resulting access gained by performing an exploit successfully. The control data 206 may in other embodiments comprise data indicating an asset(s) with which the control is associated. The asset data 208 may include an asset identifier. The asset data 208 may in other embodiments include data identifying one or more vulnerabilities associated with the asset. Assets may be represented such that it is possible to programmatically determine whether any given asset is a subset of any other given asset. For example, in one embodiment, a hierarchy of children nodes may be guaranteed to be subsets of their parents. Known vulnerabilities data 210 may comprise a vulnerability identifier. In other embodiments, the known vulnerabilities data 210 may comprise data associating each known vulnerability with the asset(s) and/or exploit(s) with which it is associated. Exploits data 212 may comprise an exploit identifier, a prerequisite access level required to perform the exploit successfully, and a resulting access level that may be gained by performing the exploit successfully. The exploits data 212 may in other embodiments comprise data identifying the vulnerability(s) with which the exploit is associated. The exposures data 214 represents data and information pertaining to inherent weaknesses within a system or application that may be used to effect an attack by a threat agent. An exposure ID may be used to identify a particular exposure, included within exposures data 214. By using an exploit, exposure, or vulnerability, a threat agent can access and compromise an asset. The attack paths or chain reactions (that is, successive compromises leading to subsequent and additional assets) that develop may be analyzed, as discussed below, in order to prevent and/or stop an attack from occurring.

Figure 3:
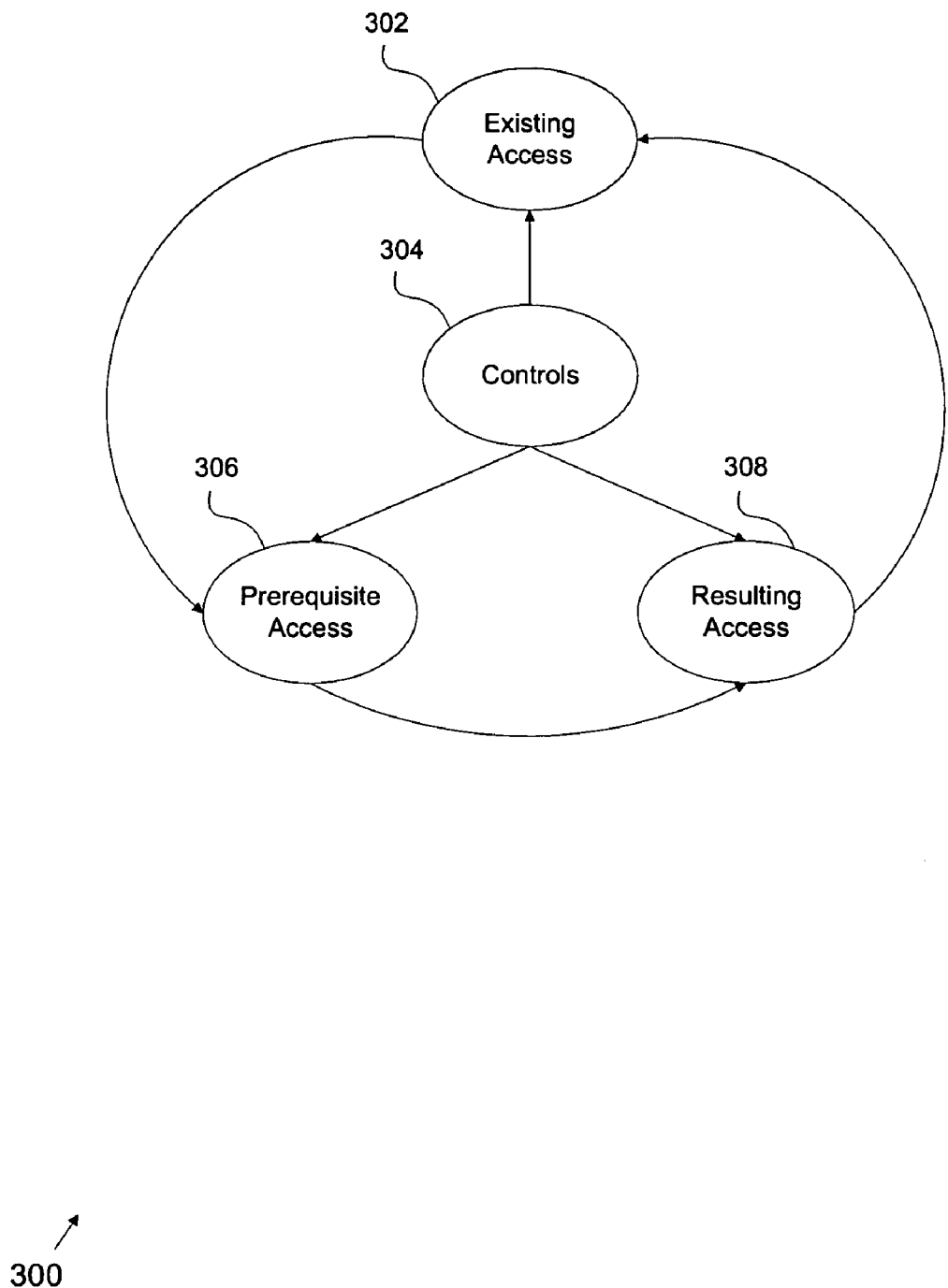
FIG. 3 is another relational diagram illustrating relationships between controls and access, in accordance with an embodiment.

FIG. 3 is a relational diagram illustrating relationships between controls and access, in accordance with an embodiment. In the example shown, relationships between existing access 302, controls 304, prerequisite access 306 and resulting access 308 are illustrated. The existing access 302 of a threat agent is compared with the prerequisite access 306 associated with an exploit to determine if the threat agent has/could use the exploit to exploit an associated vulnerability. If the existing access 302 is greater than or equal to the prerequisite access 306, the resulting access 308 associated with the exploit may be attained. Controls 304 may impact the existing access 302, the prerequisite access 306, and/or the resulting access 308, depending on the nature of the control. Controls 306 may be implemented as passwords, encrypted keys, behavioral passwords, passphrases, or other security measures or countermeasures used to prevent unauthorized entities (e.g., attackers, hackers, etc.) from gaining access to an asset and/or to limit or influence the consequence of their gaining such access. If one or more exploits are completed successfully, the resulting access 308 attained as a result becomes the new or updated existing access 302, and a further iteration of analysis may be performed to determine if the new or update existing access 302 enables the threat agent to perform any further exploits, e.g., exploits it did not have sufficient access to perform previously but which it may now be able to perform. Successive iterations of the analysis represented by the diagram shown in FIG. 3 may be performed, enabling one to build a map of the attack path/chain reaction that may result from an initial actual or hypothetical attack. Such a map may be useful in determining quickly the worst case scenario for an attack and/or identifying responsive measures that can be taken to prevent compromise of assets that have not yet been compromised but which the attack path/chain reaction analysis indicates could be compromised if no action is taken.

Figure 4:
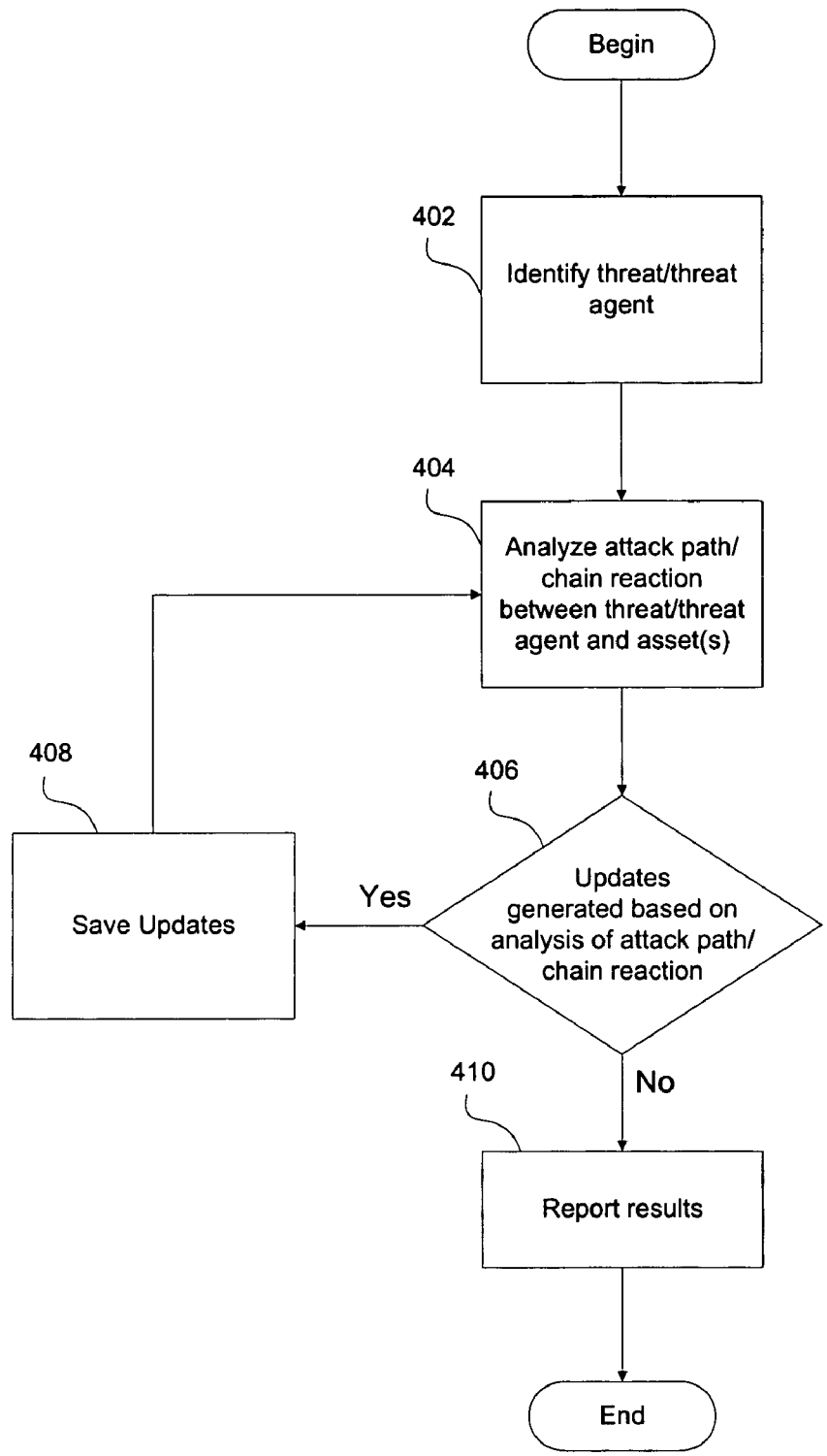
FIG. 4 illustrates a flow diagram of an overall process in accordance with an embodiment.

FIG. 4 illustrates a flow diagram of an overall process in accordance with an embodiment. Analysis engine 104 (e.g., FIGS. 1A, 1B) may be used in some embodiments to implement the process of FIG. 4. In this example, analysis engine 104 identifies a threat or threat agent. Analysis engine 104, in this example, may use data from various inputs (e.g., vulnerability assessment, network/computer security, firewall, or other similar applications) to identify a threat or a threat agent (402). A threat agent actively implements an assessed threat, acting as an entity seeking access to an asset. In other embodiments, the threat agent may also be independent of a threat.

An attack path or chain reaction is analyzed, assessing the path of compromise between the threat or threat agent and one or more assets (404). In some cases, a threatened asset may not be readily identifiable, requiring an analysis of the threat or threat agent. In some cases, the analysis performed in step 402 may be used to identify the asset(s) that have or ultimately could be compromised by the threat agent. In this embodiment, the analysis may include evaluating various types of access related to a threat, targeted assets (to be explained later as threat targets), and controls for controlling access by an outside party to a system, application, etc. By evaluating the existing access of both a threat as well as a targeted system, a transitive closure may be computed to determine what assets may be compromised. In other embodiments, transitive closures may be calculated that establish the types of access (i.e., resulting access) levels that may be achieved by a successful attack from a particular threat. In still other embodiments, other computations may be used to determine the consequences of a threat or threat agent successfully attacking an asset.

Results generated from an analysis of a threat or a threat agent may necessitate updates, based on the results of analyzing attack paths/chain reactions between a threat/threat agent and an asset (406). Updates may include editing, adding, deleting, or modifying controls or other settings such as changing an existing access level, raising a prerequisite access level, issuing a new resulting access level, etc. Updating controls to prevent an attacker from gaining access to an asset may include simply updating a time stamp or other indicia that could be used to determine validity. Other changes may include reconfiguring settings such as altering a password, access level, measure, countermeasure, etc. Updating controls may also include modification, editing, adding, or deleting controls and any associated settings. In some embodiments, no changes might occur in order to update controls. However, updating controls may include actions such as changing an access level (e.g., existing, prerequisite, resulting, etc.), invoking a security measure/countermeasure, or modifying configuration settings for a firewall, etc.

Updating may be performed by sending output data and information, which may include output control and vulnerability data, from analysis engine 104 via an output communications module 108. Updating may also be performed by saving data and information to a database or other repository where configuration settings and control and vulnerability data are stored. The stored configuration settings and control and vulnerability data may be used during the operation of security applications, systems, measures/countermeasures, and other implementations used to defend assets against attackers. If an update occurs, then the update is saved to a system memory, cache, or other storage device such as database 110 (408) and the attack path/chain reaction analysis proceeds using the updated information. The updates may be saved as control or vulnerability data for later use in additional analyses. If no update is required, then results of the analysis of the attack path/chain reaction between a threat or threat agent and an asset are reported. The updates may include updates to the existing access of the threat agent, based on the resulting access that has been or would be attained as determined in a prior iteration of the attack path/chain reaction analysis as described above. Once the attack path/chain reaction analysis (404) has been completed and no further updates are being generated (406), i.e., the last iteration of the attack path/chain reaction analysis has been performed, results of the attack path/chain reaction are reported (410). Reported results, in an embodiment, may be communicated as data between system 102 and other components responsible for implementing controls. In other embodiments, results of the analysis may be presented on a graphical user interface (GUI) to enable security and network administrators to monitor system security.

Figure 5:
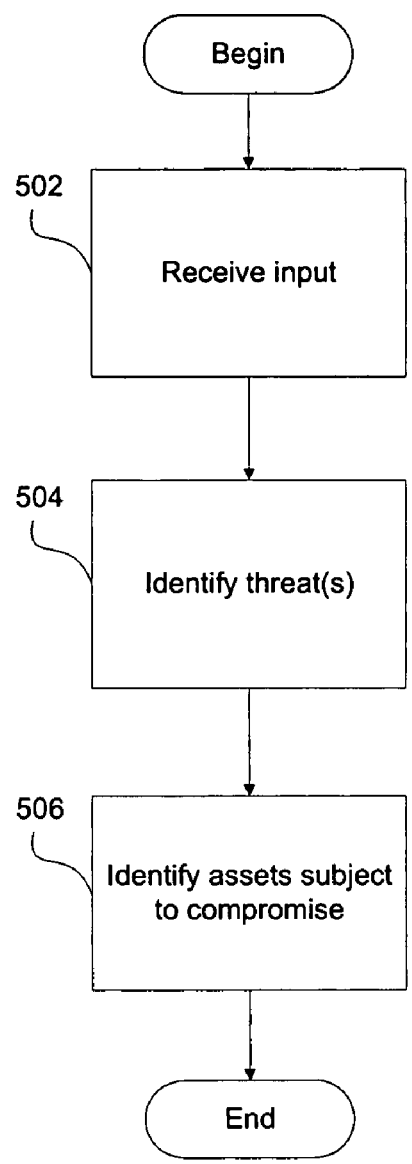
FIG. 5 is an illustration of a further process for identifying a threat or threat agent, in accordance with an embodiment.

FIG. 5 is an illustration of a further process for identifying a threat or threat agent, in accordance with an embodiment. The embodiment shown provides further detail as to the process for identifying a threat or threat agent. In this embodiment, threats are identified using inputs are received by analysis engine (502). The received inputs are then used to identify a threat, which may also include identifying a threat agent, a threat target, or threat mechanism (504). Received threats may originate from a variety of sources or raise alarms/alerts from various applications or systems. For example, a vulnerability assessment, incident management, and/or anti-virus application or system may identify a virus or worm as having infected a system associated with the network. In this embodiment, a threat may include several components, including a threat agent, a threat target, and a threat mechanism. In the embodiment shown, a threat agent actively implements a threat. A threat target is the direct or indirect objective of a threat. A threat agent implies an associated threat to the threat target, which may or may not be known initially. A threat mechanism implements the attack instituted by the threat agent. The threat mechanism may represent a vulnerability, exploit, or an exposure. A vulnerability may be a flaw in a system or application. An exposure may be an inherent weakness in the functionality of a system or application (e.g., FTP enables the upload/download of files, providing an opportunity to upload an attack or retrieve information, etc.). An exploit may be a tool such as a method for using a vulnerability or exposure or an actual instance of using a vulnerability or exposure. In other embodiments, a threat may include fewer or more components than the threat agent, threat target, threat mechanism, vulnerability, exploit, and exposure described above.

Once identified, a primary asset may be subject to attack by the threat agent (506). In addition, other assets may be incidentally compromised as the result of an attack against a primary threat target. By gaining access to a threat target, threats to subsequent assets may be detected if incidental audits are performed against the secondary assets and the threat agent. Additional audits may be performed to determine if subsequent assets are also threatened by the threat. By identifying a particular threat, its mode of attack, and the assets sought for compromise, analysis engine 104 can generate output control and vulnerability data for use in directing an incident management, vulnerability assessment, anti-virus application, network security suite, etc. as to how to stop the attacker. Identification of the types of assets sought for compromise, the type of compromise, and attack vectors (i.e., paths) leading to compromise are performed in order to enable further analysis of a threat by, in this example, analysis engine 104. In some embodiments, it may not be possible to identify a priori the assets sought to be compromised, and the analysis shown in FIG. 4 is performed to determine which assets may be compromised under a worst case scenario (i.e., assuming the threat agent exploited successfully and to its end every attack path available to it).

Figure 6:
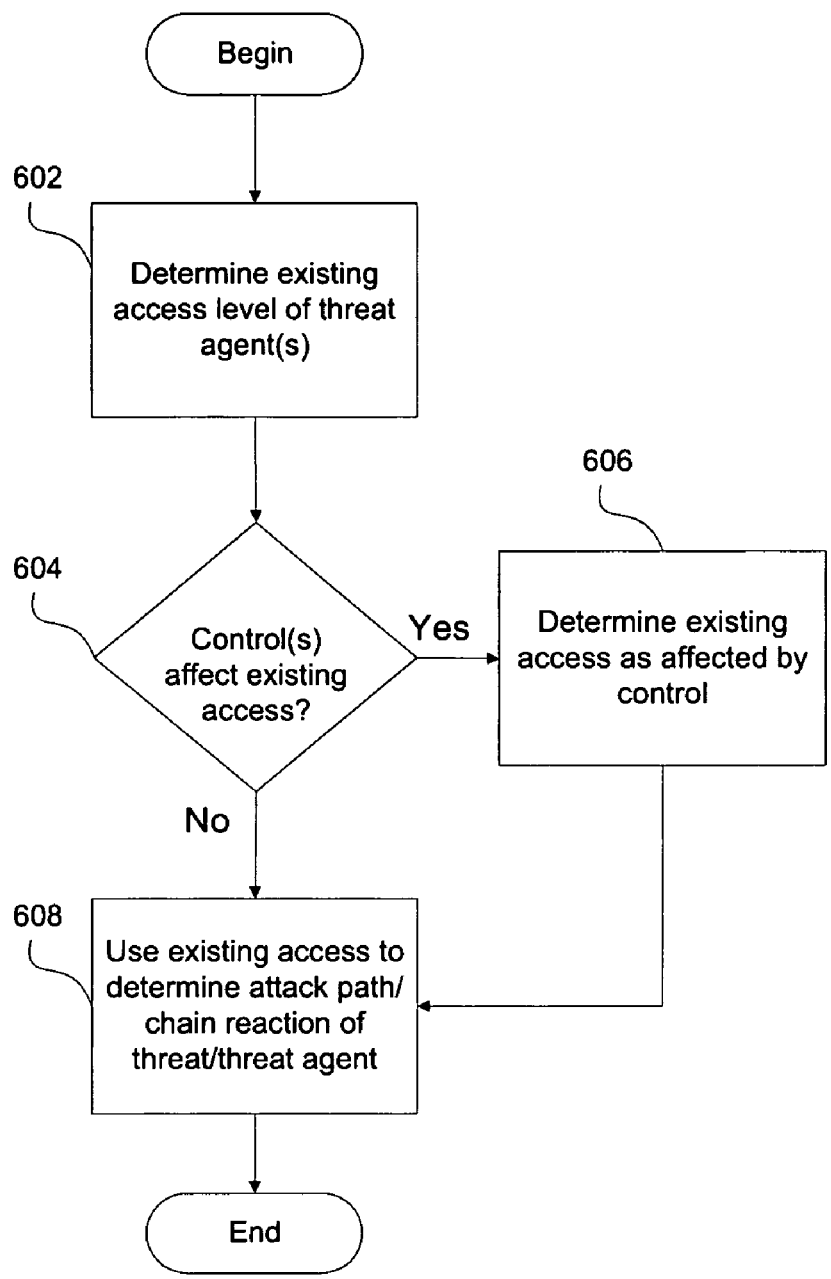
FIG. 6 is an illustration of a process for analyzing an attack path or chain reaction of a threat or threat agent, in accordance with an embodiment.

FIG. 6 is an illustration of a process for analyzing an attack path or chain reaction of a threat or threat agent, in accordance with an embodiment. In the example shown, further illustration is provided as to the analysis performed against a threat agent, when determining the attack path or chain reaction that could enable the compromise of an asset. In some embodiments, the process shown in FIG. 6 is used to implement step 404 in FIG. 4.

An existing access level of one or more threat agents is determined (602). In one embodiment, the analysis engine 104 may evaluate a previously selected threat agent for purposes of analyzing its attack path. In other embodiments, multiple threat agents could be analyzed. Once the access level of the threat agent has been determined, then it is determined whether controls affect the existing access (604). If it is determined that controls affect the existing access level, then the existing access level as affected the by control(s) is determined (606). If controls do not affect existing access (604), or once existing access has been filtered or updated to reflect the affect of the applicable control(s) (606), the existing access is used to determine the attack path or chain reaction that may have been and/or could be pursued by the threat agent under analysis (608). This type of analysis may be invoked in response to an actual intrusion or incident as well as used in a hypothetical scenario planning setting. Hypothetical or "what if" analyses may be performed to determine the type of compromise, resulting access, and assets affected by a particular threat or threat agent. The results of the above analysis may be used to generate information for use in directing security measures/countermeasures from an incident management system, security application, or some other protective measure. In some embodiments, the process shown in FIG. 6 would be repeated for each iteration of step 404 of FIG. 4. At the end of each iteration, a consolidated resulting access would be used to update the existing access of the threat agent, and a next iteration of the process shown in FIG. 6 would begin, using the updated existing access as the existing access of the threat agent.

Figure 7:
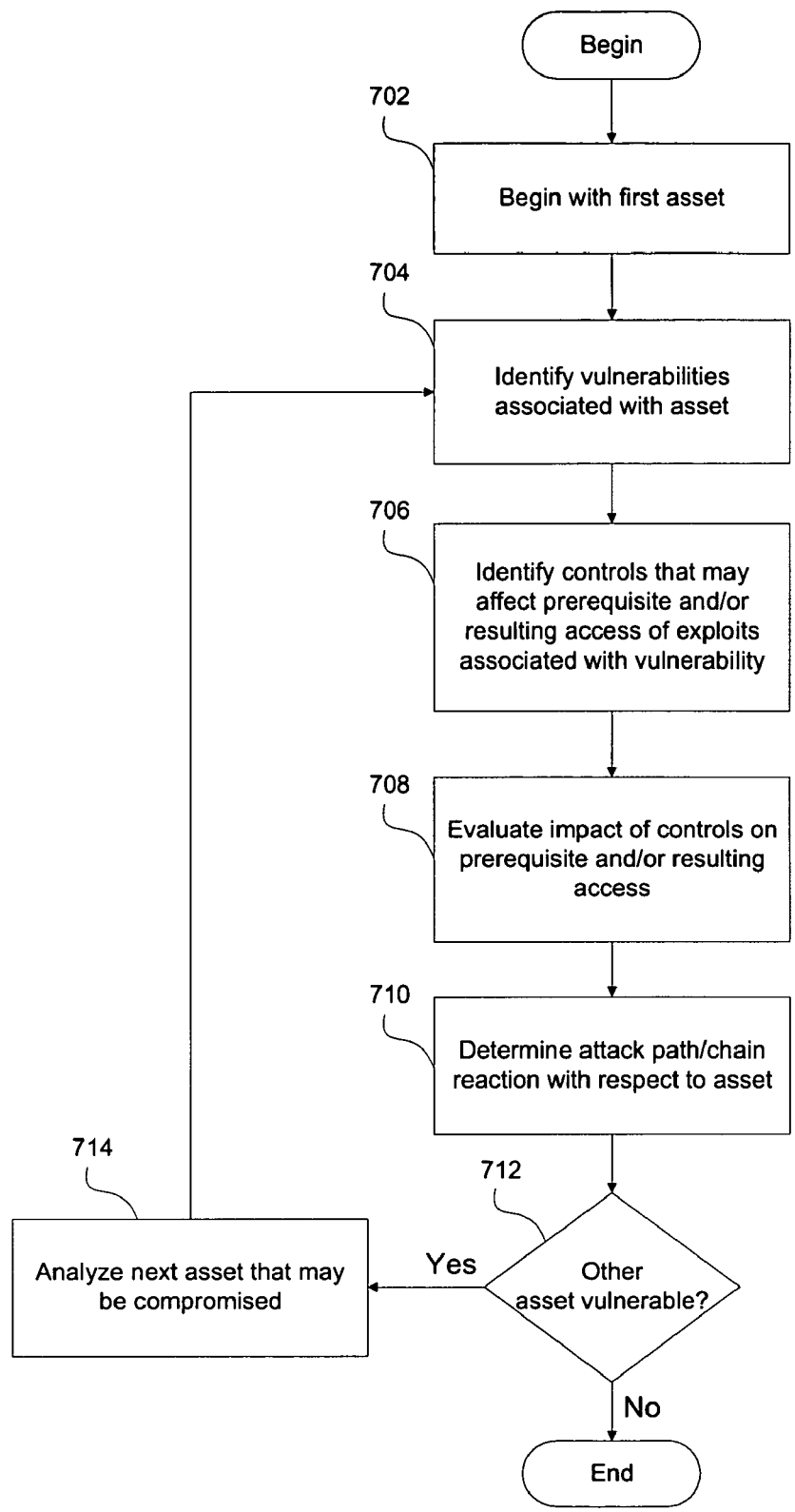
FIG. 7 illustrates a process for analyzing a threat, in accordance with an embodiment.

FIG. 7 is illustrates a process for analyzing a threat or threat agent, in accordance with an embodiment. In some embodiments, the process of FIG. 7 may be used to implement step 612 of FIG. 6. In this example, a first asset is identified for beginning the below analysis (702). The vulnerabilities associated with the asset are determined (704).

Once determined, vulnerabilities are evaluated by identifying controls that may affect prerequisite access and/or resulting access of exploits associated with the identified vulnerability(s) (706). After identification, the impact of the controls, if any, on prerequisite and the resulting access is evaluated (708). Based on the results of this analysis, an attack path or chain reaction involving a particular threat or threat agent may be determined for the asset (710). As described more fully below, any given asset may be associated with one or more vulnerabilities, and each vulnerability may be associated with one or more exploits. In some embodiments, steps 704 through 710 comprise analyzing the vulnerabilities associated with an asset under consideration in a particular iteration of said steps, and the exploits associated with each such vulnerability, to determine which, if any, of the exploits the threat agent may be able to use to exploit successfully a vulnerability of the asset, thereby gaining the resulting access associated with such exploits. After determining the attack path or chain reaction for one asset, it is determined whether additional assets are also vulnerable (712). If so, then a next asset is selected for analysis (714), and steps 704 through 712 are repeated for the next asset. If no further assets are subject to compromise, then the process ends.

Figure 8:
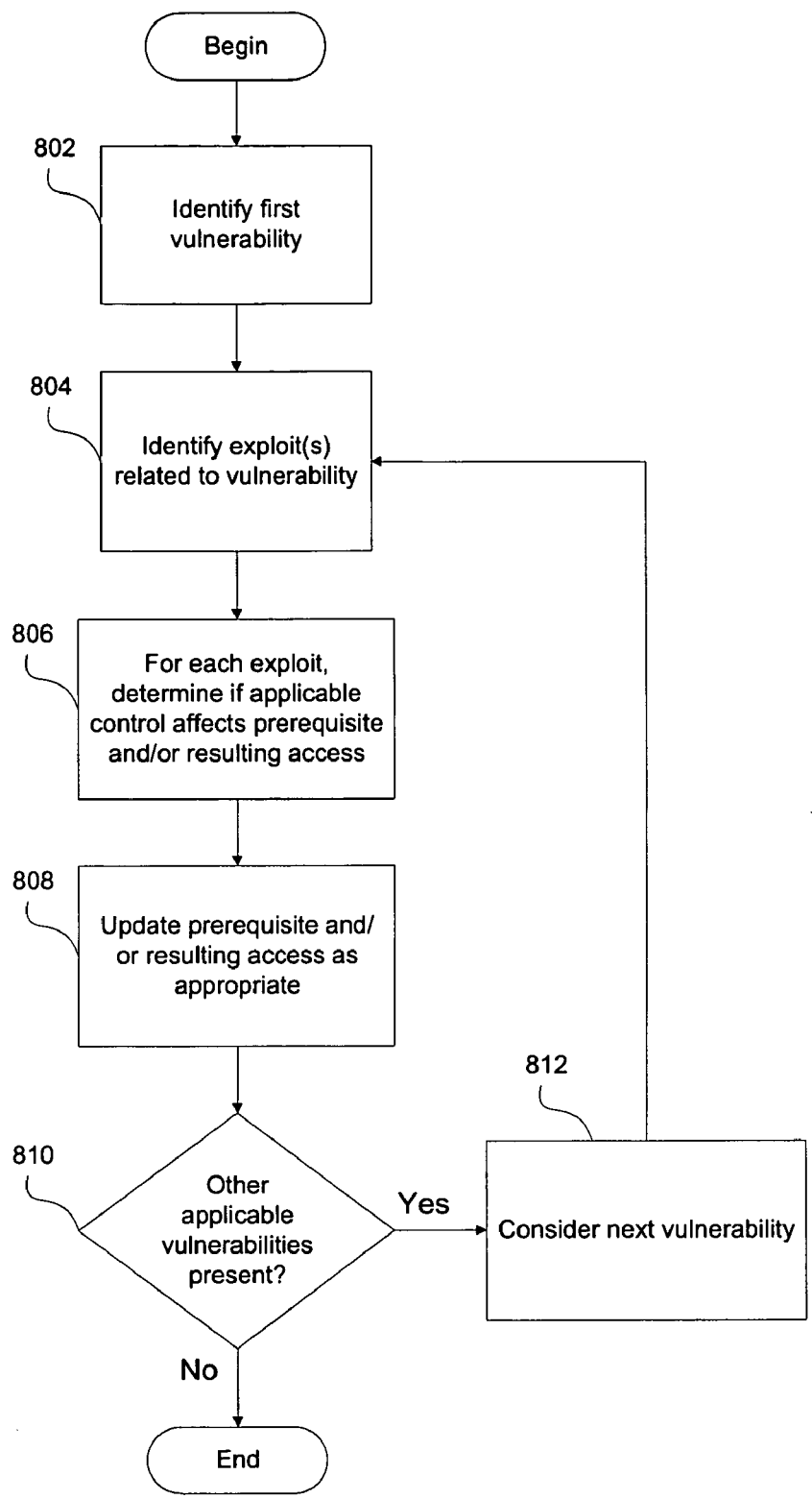
FIG. 8 illustrates a flowchart for evaluating the impact of controls, in accordance with an embodiment.

FIG. 8 illustrates a flowchart for evaluating the impact of controls, in accordance with an embodiment. In some embodiments, the process of FIG. 8 may be used to perform step 708 of FIG. 7. A first vulnerability is selected to begin the analysis (802). Once selected, the vulnerability is analyzed to determine exploit(s) that are related to the vulnerability (804). For each exploit, it is determined whether an applicable control affects the prerequisite and/or resulting access levels associated with the exploit (806). By determining whether controls affect the prerequisite and/or resulting access level, updates are implemented (808). After making any updates, then a determination is made as to whether any additional applicable vulnerabilities are present (810). If so, then the next vulnerability is identified and selected (812), and the above process is repeated with respect to the next vulnerability. If other vulnerabilities are present, then the process may be iteratively performed in order to analyze, for each accessible asset, the prerequisite access level and resulting access level (810). Exploits having similar prerequisite and/or resulting access levels, and/or those having a similar relationship to one or more controls, may be grouped together as a single entity, for purposes of simplifying analysis and determining attack paths or chain reactions in an efficient manner.

Once it is determined that no further applicable vulnerabilities are present (810), then the process ends.

Figure 9:
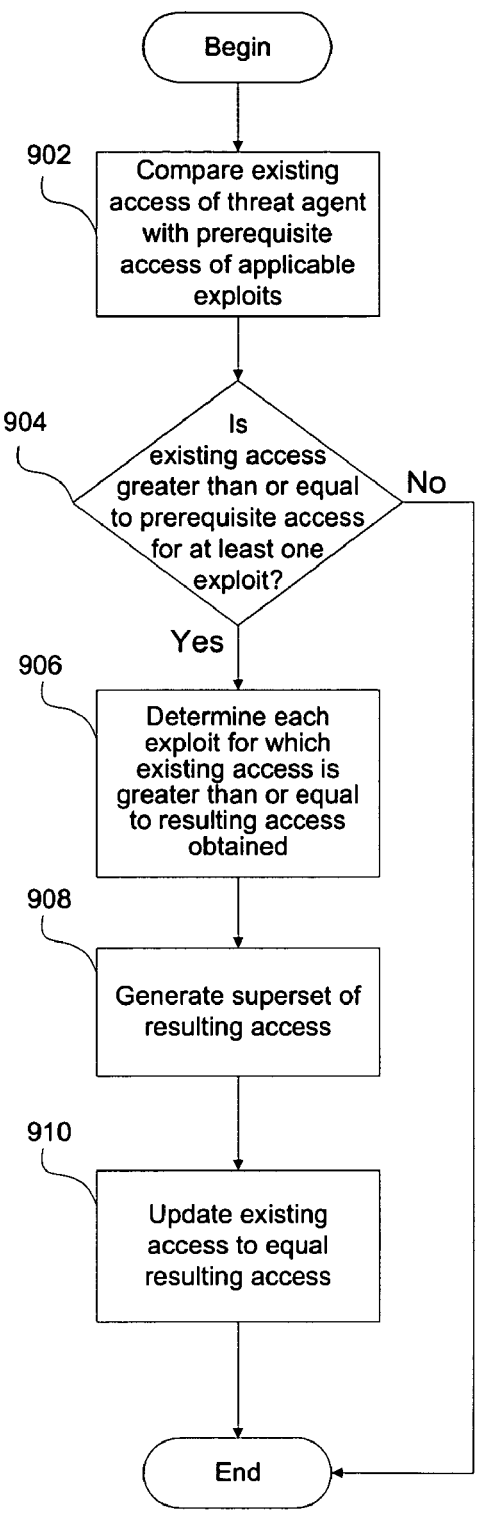
FIG. 9 is a flowchart illustrating a process for determining an attack path or chain reaction with respect to an asset, in accordance with an embodiment.

FIG. 9 is a flowchart illustrating a process for determining an attack path or chain reaction with respect to an asset, in accordance with an embodiment. In some embodiments, the process shown in FIG. 9 is used to implement step 710 of FIG. 7.

In this example, the existing access of a threat agent is compared to the prerequisite access of applicable exploits (902). A determination is made as to whether the existing access is greater than or equal to the prerequisite access for at least one exploit (which in turn enables a vulnerability to be exploited) (904). If not, then the process ends. However, if the existing access level of the threat agent is greater than or equal to the prerequisite access associated with at least one exploit, then the exploits with respect to which the existing access level of the threat agent is greater than or equal to the prerequisite access level are determined (906). Once all exploits have been for which the existing access of the threat agent is greater than or equal to the prerequisite access of the exploit are determined, then a superset of resulting access is generated (908). A superset of the resulting access may be generated by eliminating redundancy and eliminating from consideration resulting access levels that are lesser than and/or included in the resulting access achieve (or achievable) through other exploits. An update is made that reflects that the existing access level is made to be equal to the resulting access level (910). These may updates may be included in those updates performed in step 406 of FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for analyzing a threat to system security, comprising:

identifying a threat agent having an existing access level attained by the threat agent in the course of an attack;

using the existing access level to analyze an attack path between the threat agent and an asset, including by:

setting an updated access level initially to the existing access level; and iteratively comparing the updated access level with a required access level associated with a next attack along the attack path to determine whether the next attack along the attack path would be successful and, if so, updating the updated access level to equal a resulting access level associated with the next attack, until it is determined that the asset has been reached via the attack path or that no further attack along the path would be successful; and in the event it is determined that the asset would be reached by the threat agent via the attack path, taking a responsive action in real time, prior to the asset actually being reached by the threat agent, the responsive action comprising a control or other countermeasure that results in the threat agent being rendered unable to reach the asset via the attack path;

wherein comparing the updated access level with a required access level associated with a next attack along the attack path includes determining the required access level associated with the next attack along the attack path at least in part by checking a stored controls data to determine whether an existing control applicable to the next attack along the attack path is in place and, if so, updating an initial, uncontrolled required access level associated with the next attack along the path to an updated required access level that reflects the effect of the control, wherein said step of updating is performed prior to the updated required access level being compared to the existing access level.

2. A method as recited in claim 1 wherein using the existing access level to analyze an attack path between the threat agent and an asset comprises identifying a vulnerability associated with the asset.

3. A method as recited in claim 1 wherein using the existing access level to analyze an attack path between the threat agent and an asset comprises identifying an exploit method associated with a vulnerability associated with the asset.

4. A method as recited in claim 3 wherein the exploit method has associated with it a prerequisite access level required to use the exploit method to exploit the vulnerability successfully.

5. A method as recited in claim 4 wherein using the existing access level to analyze an attack path between the threat agent and an asset comprises comparing the existing access level to the prerequisite access level.

6. A method as recited in claim 3 wherein the exploit has associated with it a resulting access level that may be attained by using the exploit to exploit the vulnerability successfully.

7. A method as recited in claim 6 further including determining whether a control affects the resulting access level.

8. A method as recited in claim 1 further including determining whether the asset is subject to compromise by the threat agent.

9. A method as recited in claim 1 further including determining whether a control affects the existing access level of the threat agent.

10. A method as recited in claim 9 further including updating the existing access level to reflect the affect of the control prior to using the existing access level to analyze an attack path between the threat agent and an asset.

11. A method as recited in claim 1 wherein identifying a threat agent comprises receiving from a network security system or application data comprising an identification of the threat agent.

12. A method as recited in claim 1 wherein identifying a threat agent comprises receiving from a network security system or application data that may be used to identify the threat agent.

13. A method as recited in claim 1 further including providing output data reflecting a result of the analysis of the attack path.

14. A method as recited in claim 13 wherein the output data comprises a report of the highest level of access that has been or could be achieved by the threat agent through one or more attacks along the attack path.

15. A method as recited in claim 1 wherein using the existing access level further includes evaluating recorded data to determine the attack path.

16. A method as recited in claim 1 wherein the attack path is determined by computing a transitive closure.

17. A computer program product for analyzing a threat to system security, the computer program product being embodied in a computer readable medium and comprising computer instructions for:
identifying a threat agent having an existing access level attained by the threat agent in the course of an attack;
using the existing access level to analyze an attack path between the threat agent and an asset, including by:
setting an updated access level initially to the existing access level; and
iteratively comparing the updated access level with a required access level associated with a next attack along the attack path to determine whether the next attack along the attack path would be successful and, if so, updating the updated access level to equal a resulting access level associated with the next attack, until it is determined that the asset has been reached via the attack path or that no further attack along the path would be successful; and
in the event it is determined that the asset would be reached by the threat agent via the attack path, taking a responsive action in real time, prior to the asset actually being reached by the threat agent, the responsive action comprising a control or other countermeasure that results in the threat agent being rendered unable to reach the asset via the attack path;
wherein comparing the updated access level with a required access level associated with a next attack along the attack path includes determining the required access level associated with the next attack along the attack path at least in part by checking a stored controls data to determine whether an existing control applicable to the next attack along the attack path is in place and, if so, updating an initial, uncontrolled required access level associated with the next attack along the path to an updated required access level that reflects the effect of the control, wherein said step of updating is performed prior to the updated required access level being compared to the existing access level.

* * * * *